United States Patent Office 3,532,288
Patented Oct. 6, 1970

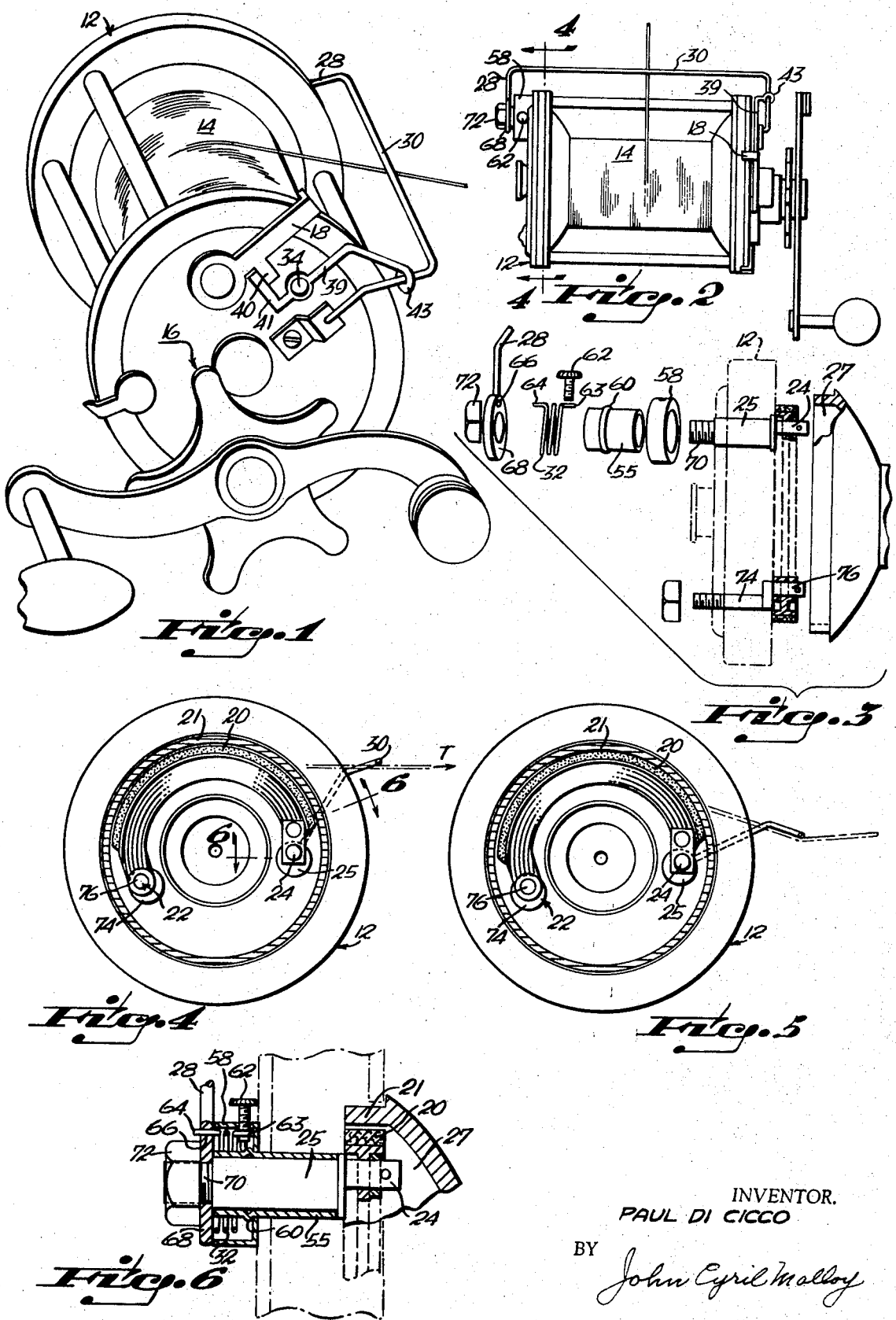

3,532,288
ANTIBACKLASH BRAKE SYSTEM
FOR FISHING REEL
Paul Di Cicco, 1498 NE. 135th St.,
North Miami, Fla. 33161
Filed Feb. 23, 1968, Ser. No. 707,839
Int. Cl. A01k 89/02
U.S. Cl. 242—84.52
10 Claims

ABSTRACT OF THE DISCLOSURE

An antibacklash brake system is alternately operable with the main drag brake of a fishing reel. The antibacklash brake system includes a pivoted brake shoe normally, adjustably spring biased into engagement with the spool of the reel and further includes a tension sensing bail riding on the fishing line to lightly apply the brake except during that portion of the cast when the tension on the unwinding line is sufficient to lift the brake shoe free of the spool. The reel also has a conventional drag brake system selectively connected through a positive clutch to the spool. A suitable clutch lever extending exteriorly of the reel frame can be positioned in either closed position in which the drag brake retards unwinding of the line, e.g., by the pull of a fish, or open position disconnecting the clutch so that the line can be cast by rotation of the spool independently of its associated drive means and drag brake. Suitable linkage connects one end of the bail to the clutch lever to release the antireverse brake for operation when the clutch lever is moved to open position and conversely to remove the application of the antibacklash brake when the clutch lever is moved to closed position.

---

In the past, the problem of backlash has been recognized which occurs when casting caused when the sinker hits the water at which time the reel is free spinning and continues to rotate with the result that the slack is often reversely wound on the reel. This invention provides an improved normally applied antibacklash brake which includes sensing means responsive to the in-flight tension in the line i.e., while the sinker is in-flight and before the sinker strikes the water, to temporarily release a brake so that the reel is free spinning only while the line is in flight and which is responsive to the loss of in-flight tension so that the brake is applied instantaneously by spring means as the slack in the line occurs.

It is an object of this invention to provide an improved antibacklash braking system for fishing reels which includes brake to engage the reel and an operator means for the brake which includes sensing means responsive to line tension to release the brake and in the absence of line tension, to apply the brake to prevent antibacklash.

It is another object of this invention to provide an antibacklash braking system to supplement the conventional main drag inducing system of a fishing reel which is conventionally used on many fishing reels and applied to tire a fish taking the bait and which drag inducing system is released for casting to render the reel free spinning, the release taking place by means of an operator means, and means interconnecting the drag inducing system and the backlash brake system so that the backlash system is activated only when the drag inducing is released for casting and which antibacklash brake system includes sensing means responsive to in-flight line tension to release the brake so long as the line is under this in-flight tension with the brake being applied at all other times when the drag inducing systm is released.

It is another object of this invention to provide a simple and inexpensive brake system to provide an antibacklash deterrent for fishing reels so that when there is slack in the line and the main brake system is released, the backlash brake is applied, the said improvement being inexpensive and being adaptable for installation on existing fishing reel structures.

In accordance with these and other objects which will become apparent hereinafter, the instant invention will now be described with reference to the accompanying drawings in which:

FIG. 1 is a perspective view of a reel provided with the instant invention and illustrating the same with the drag inducing system in an applied condition;

FIG. 2 is a plan view of the reel of FIG. 1;

FIG. 3 is an exploded view illustrating the operating members of the instant invention;

FIG. 4 is a view in cross section taken along the plane indicated by the line 4—4 of FIG. 2 and looking in the direction of the arrows and illustrating the drag inducing system in a released condition and the antibacklash brake released by the line tension T;

FIG. 5 is a view similar to FIG. 4 and illustrating the antibacklash brake applied; and FIG. 6 is a view in cross section taken along line 6—6 of FIG. 4 and looking in the direction of the arrows.

Referring to the drawings, wherein like reference characters designate like or corresponding parts throughout the different view, and referring particularly to FIG. 1, there is shown a housing 12 for a spool or reel 14 which is journalled in the housing. As the conventional reel is provided with a drag inducing system operably housed and carried on its cover plate which is to apply drag to the line when a conventional, positive clutch operator arm 18 is rotated into the position shown in FIG. 1. The housing 12, reel 14, drag inducing system 16 and operator 18 are well known in the art, as is the utilization of the pivotal bail on the housing in spanning relation of the reel throat, which is in the raised position, as shown in FIG. 1, while the drag inducing is applied.

The present invention provides a antibacklash brake system to counteract backlash, which is the tendency of the free spinning reel to continue to rotate and to play out line after the sinker strikes the water causing reverse wind of the slack as the reel continues to rotate. The antibacklash brake system (1) is operably connected to the operator arm 18 of the drag inducing system so as to be in normal braking engagement with the reel so long as the drag inducing system is released, and (2) to the bail 30 so that for the brief period during casting while the sinker is in flight and there is a tension on the line sensed by the bail 30 by a lifting force on it, as is indicated by the arrow in FIG. 4, the backlash brake is disengaged, until the tension is released and there is slack in the line which occurs, as indicated in FIG. 5, when the sinker hits the water, at which time the antibacklash brake system immediately resumes its normal position of engagement with the reel to stop it so that no backlash occurs by prohibiting further line from feeding from the reel.

Referring to the antibacklash brake system, and particularly to FIGS. 4 and 5, it is seen that it includes a brake shoe 20 on the housing in close, adjacent relation to a drum flange 21 of the reel. The brake shoe is pivotally mounted as by the pivot means 22 with a portion thereof operably connected to a cam 24, so that as the cam is turned it is effective to displace the shoe by pivotal movement into and out of braking engagement with the reel as seen in FIGS. 5 and 4 respectively. The cam or eccentric is carried on one end of the shaft 25 within the operating chamber 27 and to the outer end of the shaft a rearwardly and downwardly extending arm portion 28 of the bail 30 is connected to rotate the shaft on movement of the bail from the normal position shown in FIG. 5, with the antibacklash brake applied, to the brake release position shown in FIG. 4 while the tension T is applied to the line as in casting. The shaft is biased by the spring 32 into the brake applied position, so that as long as the antibacklash brake system is activated, the brake shoe 20 is held by the spring in engagement with the corresponding portion 21 of the reel and the reel is not free spinning except when the tension T on the line is sufficient to overcome the spring bias, which spring is responsive to such tension. Means are provided to connect the antibacklash brake system to the drag inducing system through the operator arm 18 so as to be activated only while the drag inducing system is not applied, as seen in FIG. 1, and to connect the second brake system to the bail so as to sense and to be responsive to tension on the line so that the secondary brake is applied to prevent antibacklash except during the period of time when the sinker is in flight. The means to connect include an interlock member 39 rotatable on a pin 34 and carrying a foot 41 in the path of travel of a projection 40 on the operator arm 18 and a terminal loop 43 which permits swinging movement of the bail from the raised position illustrated in FIG. 1 to the lowered, secondary brake engaged position in FIG. 5.

In operation, when the drag inducing system is applied, as shown in FIG. 1, the bail 30 is raised by the operator arm projection 40 engaging the foot 41 of the interlode member 39. When the drag inducing system is released by rotating the operator arm 18, the bail 30 is free to drop into a lowered position seen in FIG. 5 by reason of its own weight and as urged by the spring 32. While in this position the antibacklash brake system is applied with the shoe and drum 20 and 21 in engagemnt, FIG. 5. As the line is cast, and only so long as the tension T, FIG. 4, is applied to the line, the antibacklash brake is released. The cycle is repeated when the drag inducing system is applied which again raises the bail which rotates the shaft 25 disengaging the antibacklash brake.

In the embodiment shown, a tension adjusting means provided for the spring 32 comprising a sleeve 55 secured to the reel housing 12 by a suitable means to rotatably receive the cam shaft 25, and an annular spring housing 58 rotatably held in position against the reel housing 12 by means of an annular ridge 60 on the sleeve 55 as seen in FIG. 6. A set screw 62 is threadably received through the housing 58 in engagement with one end 63 of the spring 32 to adjustably hold the housing in affixed relation to the sleeve 55, the other end 64 of the spring being engaged through an appropriate aperture 66 in a hub portion 68 of the bail arm 28. The outer end of the shaft 25 comprises a reduced diameter screw threaded portion 70 to receive a nut 72 to retain the assembly as just described. It is therefore readily apparent that the spring tension can be increased or decreased as desired by loosening the set screw 62, rotating the spring housing 58 and retightening the set screw 62 in the desired position.

The pivot means 22 comprises a shaft 74 rotatably carried in the housing and having an eccentric 76 projecting into the chamber 27 with the eccentric being effective to pivot the shoe on displacement of the eccentric 24 into braking engagement with the reel. It will be apparent that the backlash system is adapted for inclusion in existing fishing reels without major modification, the units of the assembly being adapted for inclusion within the operating chamber 27 defined between the housing and the spool portion of the reel.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. For use in a conventional reel of the type including:
 a housing (12);
 a spool having a throat (14) for a fishing line journalled to the housing,
 a bail (30) in spanning relation of the speed throat pivotally supported on the housing for movement responsive to tension on the line,
 a drag inducing system (16) connected to said spool to apply drag to the spool upon unwinding of the line, and
 an operator (18) to selectively disconnect said drag inducing system with said spool;
 the improvement of antibacklash brake system comprising:
 (A) a brake means (20) on the housing in close, adjaecnt relation to the spool (14);
 (B) means (22) to movably mount the brake means to the housing; and
 (C) operator means on the housing for moving the brake means into and out of braking engagement with the spool (14), said operator comprising said bail and
  (a) a shaft (25);
  (b) a cam (24) rotatably carried on said shaft and effective on rotation of the shaft to move the brake means into and out of braking engagement with the spool;
  (c) spring means (32) to normally hold the brake means (20) in the brake applied position to resist rotation of the spool;
  (d) means including said bail (39, 40, 41) connecting the antibacklash brake system to the operator (18) of the drag inducing system to hold the shaft and carried brake means out of braking engagement with the spool when the drag inducing system is applied; and
  (e) the bail being responsive to lifting forces by tensioning of the line to rotate the shaft and release the brake means so long as tension is applied on the line and storing energy in the spring means (32) so that when the lifting forces on the bail cease to be applied, the spring means will return the shoe into normal braking engagement with the reel to prevent backlash.

2. The improvement as set forth in claim 1 wherein said means connecting the antibacklash brake system to the operator of the drag inducing system comprises a pivotal member, said member having a foot in the path of travel of said operator 18 and responsive to movement of the operator (18) to the brake applied position to shift said member and move said brake means to a brake release position.

3. The improvement as set forth in the claim 1 wherein the bail of said connecting means includes a member connected for rotation with the shaft (25), said member being connected to said bail and responsive to raising and lowering of said bail to move said brake means out of and into brake engagement with said reel.

4. The improvement as set forth in claim 2 wherein said member includes a portion connected to said bail so that it is responsive to raising and lowering of said bail to move said brake means out of and into brake engagement with said reel.

5. The improvement as set forth in claim 3 wherein said member includes a ring on the outer end circumposed about a portion of said bail.

6. The improvement as set forth in claim 1 wherein said operator means includes a sleeve carried by said housing with said shaft being rotatably journalled in said sleeve.

7. The improvement as set forth in claim 6 wherein said cam comprises an eccentric carried on the inner terminal end of the shaft.

8. The improvement as set forth in claim 1 wherein adjusting means are provided to adjust said spring.

9. The improvement as set forth in claim 1 wherein said pivot means comprises a shaft rotatably journalled in said housing and an eccentric in said shaft in engagement with said brake means.

10. The improvement as set forth in claim 6 wherein said outer terminal end of said shaft includes removable keeper means to releasably secure said bail to said shaft for rotation therewith and means circumposed about said shaft to protectively house spring means.

References Cited

UNITED STATES PATENTS

| | | | |
|---|---|---|---|
| 2,354,530 | 7/1944 | McMahon | 242—84.44 |
| 2,579,532 | 12/1951 | Allen | 242—84.52 |
| 2,607,547 | 8/1952 | Pasamén | 242—84.52 |
| 2,658,696 | 11/1953 | Cooper | 242—84.52 |

BILLY S. TAYLOR, Primary Examiner